No. 869,767. PATENTED OCT. 29, 1907.
G. F. ARMSTRONG, Jr.
TRUCK WHEEL.
APPLICATION FILED APR. 3, 1907.
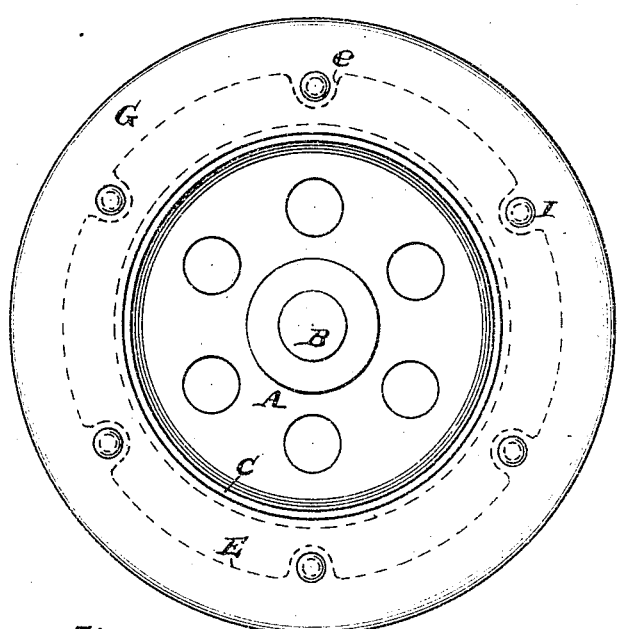
FIG.1
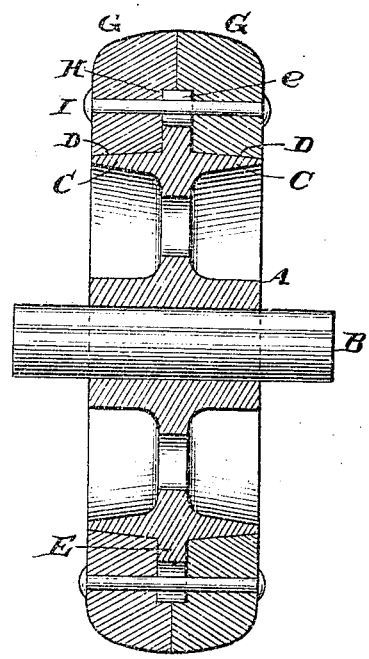
FIG.2
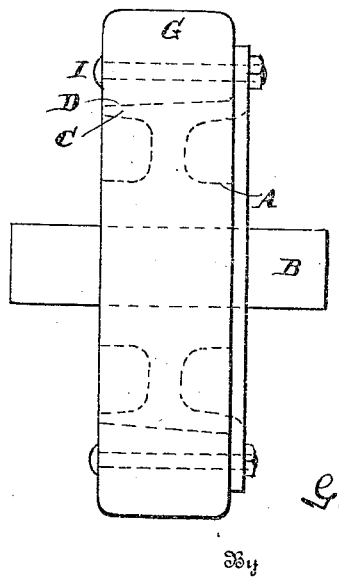
FIG.3
Witnesses
Inventor
George F Armstrong Jr.
By
Attorney

UNITED STATES PATENT OFFICE.

GEORGE F. ARMSTRONG, JR., OF NORTH WALES, PENNSYLVANIA.

TRUCK-WHEEL.

No. 869,767.  Specification of Letters Patent.  Patented Oct. 29, 1907.

Application filed April 3, 1907. Serial No. 366,109.

*To all whom it may concern:*

Be it known that I, GEORGE F. ARMSTRONG, Jr., of North Wales, county of Montgomery, and State of Pennsylvania, have invented an Improvement in Truck-Wheels, of which the following is a specification.

My invention relates to truck wheels more specifically used on merchandise trucks employed in and about stores.

The object of my invention is to provide a construction of truck wheel which shall be almost noiseless and not injurious to the floors when made of tile or marble. This object I accomplish by forming the wheel with a metal hub upon the rim of which annular pulleys of vulcanized paper or fiber are secured, preferably by being formed in sections and riveted or bolted in place upon the hub. In my preferred form the sections of the vulcanized paper may be bolted or riveted together and to a circumferential flange on the hub by transverse bolts or rivets, all of which will be better understood by reference to the drawings, in which:

Figure 1 is a side elevation of a truck wheel embodying my invention; Fig. 2 is a vertical cross sectional view of the same; and Fig. 3 is an elevation of a modification of my invention.

A is a cast iron hub and may be provided with a hole fitted, if desired, with an axle B. This hub is formed with a central circular web which may be provided at the periphery with the lateral flanges C, C and the circumferential flange E. These flanges C, C are preferably somewhat tapering outward as at D. The rim F of the wheel is formed of two or more circular sections of vulcanized paper or fiber as indicated at G, G, which are forced upon the tapered flanges C, C. The inner lateral faces of the sections G, G, may be grooved as at H so that when they abut they inclose the circumferential flange E. Transverse rivets or bolts I are employed to extend through the layers G and the flange E to clamp all of the parts firmly together and prevent the rim F from turning upon the hub.

The circumferential flange E may be notched as at e instead of having holes bored or cast in it to permit the rivets or bolts I to extend through in uniting the two sections of the rim. This construction also prevents the rim turning about the hub should it from any cause become loosened. It is evident that while I employ two sections G, G of fiber, in the case of small wheels, for light trucks only one such section need be required as will be evident by reference to Fig. 3.

It is evident that while I prefer to make the hub or central metallic portion open, for cheapness and lightness, it is immaterial to my invention. The term lateral flanges used by me are to be taken in a broad sense as comprehending the annular surfaces, tapered or otherwise upon which the fiber sections are secured.

While I have shown my invention in the form I have found most excellently adapted for commercial use, nevertheless the minor details may be modified without departing from the spirit of the invention.

Having now described my invention, what I claim as new and desire to secure by Letters Patent, is:—

1. A truck wheel consisting of a central metal hub having oppositely directed tapered flanges with the smallest diameters directed away from each other and largest diameters at the middle, combined with two annular fiber rim sections tightly sleeved upon the tapered flanges, and transverse fastening devices extending through the sections for uniting them together and upon the hub.

2. A truck wheel consisting of a central metal hub having oppositely directed lateral tapered flanges and a circumferential central flange, combined with two annular fiber rim sections tightly sleeved upon the tapered flanges and inclosing the circumferential flange, and transverse fastening devices extending through the sections for uniting them together and upon the hub.

3. A truck wheel consisting of a central metal hub having oppositely directed lateral tapered flanges and a circumferential central flange, combined with two annular fiber rim sections tightly sleeved upon the tapered flanges and inclosing the circumferential flange, and transverse fastening devices extending through the sections and the circumferential flange for uniting them together and upon the hub.

4. In a truck wheel the combination of a central metal portion having two oppositely directed tapering portions and a central circumferential notched flange, with annular fiber rim sections tightly fitting the tapered portions, and transverse rivets extending through the rim sections and notches of the flange for holding the sections in position upon opposite sides of the flange.

5. In a truck wheel the combination of a central metal portion having two oppositely directed tapering portions and a central circumferential notched flange, with annular fiber rim sections tightly fitting the tapered portions and having undercut portions to receive the flange, and transverse rivets extending through the rim sections and notches of the flange for holding the sections in position upon opposite sides of the flange and completely inclosing the flange.

6. In a truck wheel the combination of a central metallic part having lateral annular portions and a circumferential flange, two annular fiber sections tightly fitting the annular portions of the central part and inclosing the circumferential flange, and transverse rivets extending through the fiber sections and flange for uniting them together.

In testimony of which invention, I have hereunto set my hand.

G. F. ARMSTRONG, JR.

Witnesses:
R. M. HUNTER,
R. M. KELLY.